United States Patent
Bechler

(10) Patent No.: US 9,116,241 B2
(45) Date of Patent: Aug. 25, 2015

(54) RADAR SENSOR AND METHOD FOR DETECTING PRECIPITATION USING A RADAR SENSOR

(75) Inventor: Dirk Bechler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 566 days.

(21) Appl. No.: 13/152,661

(22) Filed: Jun. 3, 2011

(65) Prior Publication Data

US 2011/0298656 A1 Dec. 8, 2011

(30) Foreign Application Priority Data

Jun. 4, 2010 (DE) .......................... 10 2010 029 699

(51) Int. Cl.
| | |
|---|---|
| G01S 13/00 | (2006.01) |
| G01S 13/93 | (2006.01) |
| G01S 13/95 | (2006.01) |
| G01S 7/40 | (2006.01) |

(52) U.S. Cl.
CPC ............... *G01S 13/931* (2013.01); *G01S 13/95* (2013.01); *G01S 13/958* (2013.01); *G01S 2007/4039* (2013.01); *G01S 2013/9321* (2013.01)

(58) Field of Classification Search
CPC ..... G01S 13/95; G01S 13/958; G01S 13/931; G01S 2007/4039; G01S 2013/9321

USPC ........................................................ 342/26 R
See application file for complete search history.

(56) References Cited

U.S. PATENT DOCUMENTS

| 4,134,677 | A | * | 1/1979 | Ling et al. ..................... 356/5.03 |
|---|---|---|---|---|
| 5,247,306 | A | * | 9/1993 | Hardange et al. ............... 342/70 |
| 6,633,815 | B1 | * | 10/2003 | Winter et al. .................. 701/301 |
| 6,691,003 | B1 | * | 2/2004 | Stortz et al. ....................... 701/1 |
| 2010/0309041 | A1 | * | 12/2010 | Hassen ........................ 342/26 R |

FOREIGN PATENT DOCUMENTS

| CN | 101535834 | | 9/2009 |
|---|---|---|---|
| CN | 101688913 | | 3/2010 |
| DE | 198 03 660 | | 8/1999 |
| DE | 19945268 | | 3/2001 |
| DE | 102006054320 | | 5/2008 |
| WO | WO 01/50152 | | 7/2001 |
| WO | WO 2005/062072 | | 7/2005 |
| WO | WO2008058786 | * | 5/2008 |

* cited by examiner

*Primary Examiner* — Frank J McGue

(74) *Attorney, Agent, or Firm* — Kenyon & Kenyon LLP

(57) ABSTRACT

In the method for detecting precipitation using a radar sensor, the radar sensor emits a transmission signal, whose frequency is varied periodically in successive modulation ramps. Signals received by the radar sensor are analyzed to determine precipitation on the basis of two different criteria. In the method, a first criterion relates to signals which are received during a pass-through of a modulation ramp, and a second criterion relates to a comparison of signals which are received during a pass-through of at least two successive modulation ramps.

29 Claims, 4 Drawing Sheets

RADAR SENSOR AND METHOD FOR DETECTING PRECIPITATION USING A RADAR SENSOR

CROSS REFERENCE

The present application claims the benefit under 35 U.S.C. §119 of German Patent Application No. 102010029699.6 filed on Jun. 4, 2010, which is expressly incorporated herein by reference in its entirety.

FIELD OF THE INVENTION

The present invention relates to a method for detecting precipitation using a radar sensor, the radar sensor emitting a transmission signal whose frequency is varied periodically in successive modulation ramps, and signals received from the radar sensor being analyzed on the basis of at least two different criteria. The present invention also relates to a radar sensor equipped for executing the method.

BACKGROUND INFORMATION

Radar sensors are used, for example, in motor vehicles for detecting the surroundings of the vehicle and for locating and determining the relative velocity of vehicles traveling ahead or of oncoming vehicles. They may be used as independent distance warning systems or as part of a driver assistance system, for example, for distance-based adaptive cruise control (ACC).

Precipitation in the form of rain or spray from the road is capable of reflecting and absorbing a portion of the emitted transmission signal and thereby causing a reduction in the range of the radar radiation and thus a reduction in the range within which objects may be reliably located. For reasons of traffic safety, it is important for such a restricted function of the radar sensor to be detectable as early and as reliably as possible.

German Patent Application No. DE 199 45 268 A1 describes a method for detecting a loss of sensitivity ("blinding") of a radar sensor, e.g., by precipitation, a plurality of parameters being checked on the basis of various criteria. Parameters checked and evaluated on the basis of the criteria are differentiated to various extents and weighted, if necessary. One of the criteria is based on an assessment of the average power of the signals received by the radar sensor. One disadvantage of this method, however, is that the average power depends not only on the presence of diffuse loss sources such as precipitation but also on a plurality of other factors, including specific properties of the radar sensor, assembly tolerances during installation in a motor vehicle as well as temperature and aging influences.

German Patent Application No. DE 10 2006 054 320 A1 describes a method for detecting precipitation using a radar sensor, likewise based on the analysis of a power feature of a received radar signal. This method is suitable for multibeam radar sensors, in particular FMCW (frequency-modulated continuous wave) radar sensors. In this method, the received radar signals of multiple radar beams are each integrated separately and the resulting integrals are compared with one another.

Using radar sensors, the velocity of an object may be determined on the basis of a frequency shift between the emitted radar signal and that reflected by an object and received based on the Doppler effect. To obtain information about the distance of the object from the radar sensor at the same time, information about the transit time of the radar signals is additionally required. In the FMCW radar method, such transit time information is obtainable by subjecting the frequency of the emitted radar signal to frequency modulation using a (often linearly) changing frequency (frequency ramp).

The received radar signal is usually mixed with a portion of the emitted signal to obtain an intermediate frequency signal. The frequency spectrum of the intermediate frequency signal is typically analyzed with the help of a fast Fourier transform (FFT). An object detected by the radar system is reflected in the frequency spectrum in a peak at a frequency, which depends on the distance and the relative velocity of the object in relation to the radar sensor.

Raindrops or splashing spray are in this sense objects which leave a weak peak in the frequency spectrum of the intermediate frequency signal at not too great distances from the radar sensor, usually at distances up to approximately 10 meters. In heavier precipitation, these peaks are added in the frequency range corresponding to the aforementioned distance range to yield a background signal, the so-called rain clutter. Due to the aforementioned distance range, the background of the intermediate frequency signal is elevated due to the rain clutter. At low vehicle speeds, the signal of the rain clutter is in the low frequency signal range of the intermediate frequency signal. At higher speeds, the signal of the rain clutter is shifted to higher frequencies in the intermediate frequency signal. Furthermore, the frequency position of the rain clutter depends on the slope of the frequency ramp of the emitted radar signal. The spectral power density in the frequency range of the rain clutter may serve as an indicator for the presence of precipitation. However, the relatively frequent case when reflection peaks from one or more actual objects are also within this frequency range, resulting in false detection of precipitation, is problematical. Such a situation occurs in particular when driving in alleys or tunnels, when driving directly next to a truck or when standing in a queue directly behind another vehicle.

SUMMARY

One object of the present invention is to provide a method for detecting precipitation, which reliably detects precipitation and is robust with respect to interfering influences. Another object of the present invention is to create a radar sensor equipped to execute the aforementioned method.

This object may be achieved according to the present invention by an example method in which a first criterion relates to signals received during a pass-through of a modulation ramp and a second criterion relates to a comparison of signals received during a pass-through of at least two successive modulation ramps.

The example method in accordance with the present invention makes use of the fact that precipitation is reflected not only in different spectral power densities within a measured spectrum during a pass-through of a modulation ramp but also in a comparison of various spectra recorded during successive modulation ramps. The diversity of the criteria increases the certainty in detection of precipitation. Another advantage is also that error-prone situations which might result in apparent detection of precipitation in one of the criteria are not problematical for the other criterion.

In an advantageous example embodiment of the method, precipitation is regarded as detected if both criteria are met simultaneously. Precipitation is particularly preferably regarded as detected only if both criteria are met simultaneously for more than a predefined period of time.

The present invention is explained in greater detail below on the basis of exemplary embodiments with reference to the figures.

DETAILED DESCRIPTION OF EXAMPLE EMBODIMENTS

Figure 1:
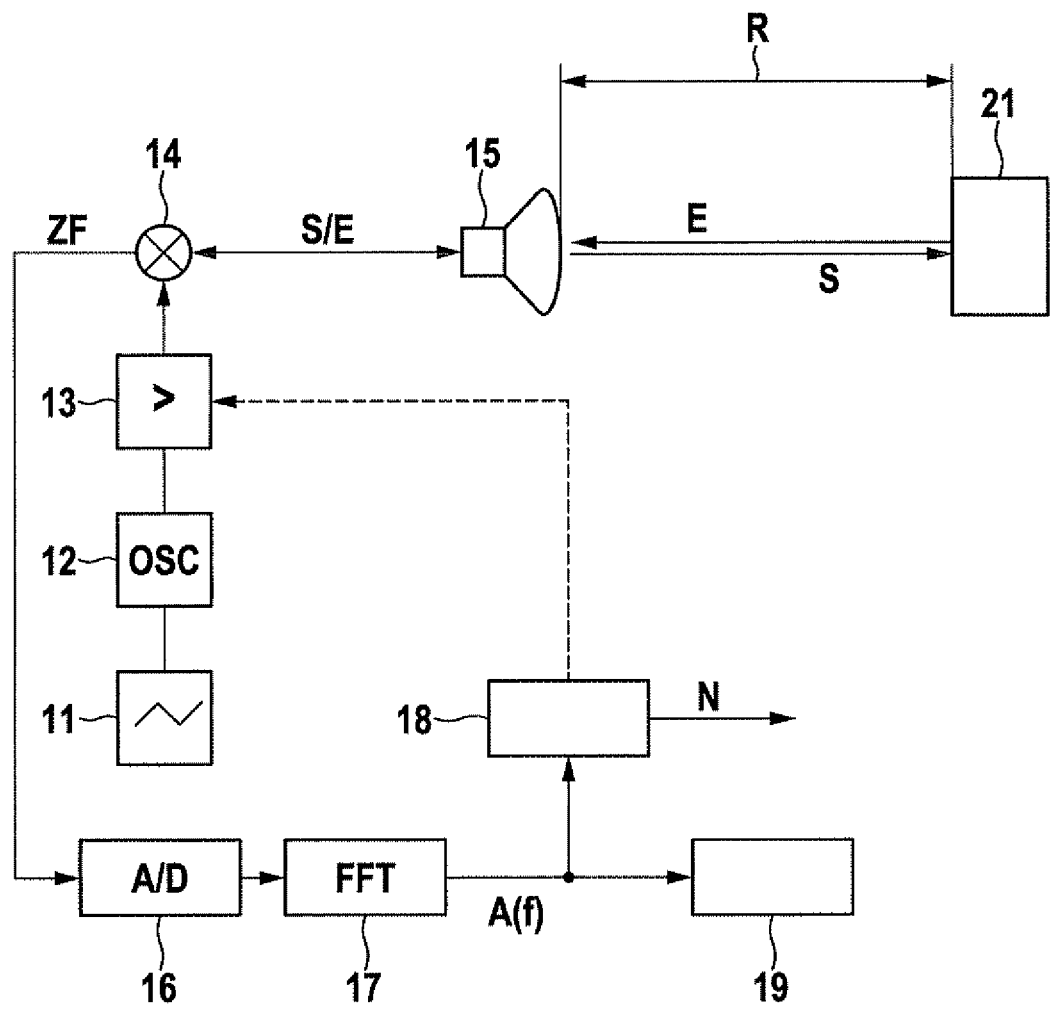
FIG. 1 shows a block diagram of a radar sensor for executing a method for detecting precipitation.

The radar sensor shown schematically in the block diagram in FIG. 1 has a ramp generator 11 for supplying frequency modulation ramps. Ramp generator 11 controls a high-frequency (HF) oscillator 12, which generates a frequency-modulated radar signal corresponding to the modulation ramps. This is amplified in an HF amplifier 13 and supplied via a mixer 14 as transmission signal S to a transmitting and receiving antenna 15. Instead of the configuration shown here using a monostatic antenna concept in which the transmitting and receiving antennas are identical, a bistatic concept in which the transmitting and receiving antennas are separate may also be provided.

A transmission signal S emitted by transmitting and receiving antenna 15 is reflected by an object 21 situated at a distance R from the radar sensor, as shown in FIG. 1 as an example. The reflected signal is received by transmitting and receiving antenna 15 and is in turn supplied as received signal E to mixer 14. Mixer 14 mixes received signal E with a portion of transmission signal S and outputs the mixed product as intermediate frequency signal ZF. After digitizing in an analog/digital converter 16, intermediate frequency signal ZF is subjected to a frequency analysis. For this purpose, the output of analog/digital converter 16 is connected to a frequency analyzer 17, which performs, for example, a fast Fourier transform (FFT) and displays at its output an amplitude spectrum A(f), i.e., the amplitude of intermediate frequency signal ZF as a function of frequency f. Amplitude spectrum A(f) is supplied, on the one hand, to a detection unit 18, which performs a precipitation detection and, if precipitation is detected, outputs a precipitation signal N, which is supplied to a driver assistance unit, for example, and influences the control performance thereof. Amplitude spectrum A(f), on the other hand, is supplied to an analyzer unit 19, which recognizes objects 21 detected by the radar sensor and ascertains their distances and relative velocities in relation to the radar sensor. Alternatively, it is possible to provide for frequency analyzer 17 to output power spectra P(f) instead of amplitude spectra A(f), the additional analysis being performed on the basis of these power spectra.

Figure 2:
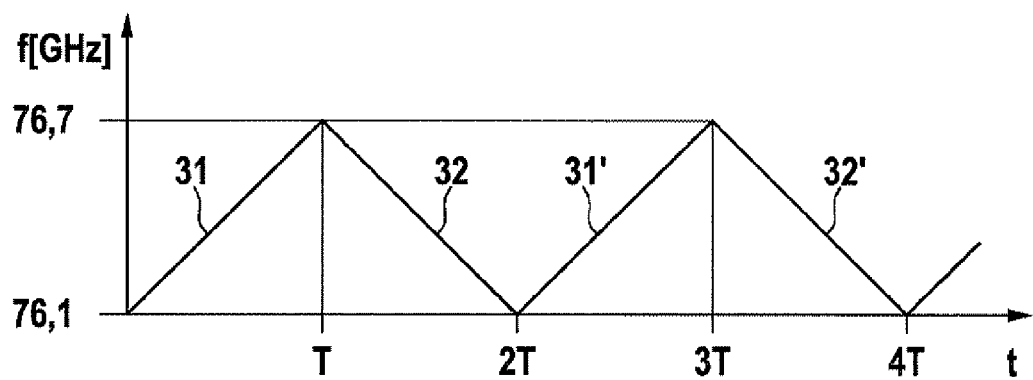
FIG. 2 shows a diagram to represent the frequency as a function of time in a transmission signal.

The radar sensor shown in FIG. 1 operates according to the FMCW method. FIG. 2 shows, as an example, frequency $f_S$ of transmission signal S as a function of time, the relationship being controlled by ramp generator 11. Frequency $f_S$ is modulated in the form of a ramp having an alternating sequence of rising and falling modulation ramps 31, 32, 31' and 32'.

Each of these modulation ramps has a period T (for example, 2 ms here) and a modulation sweep of 0.6 GHz, for example. Modulation ramps 31 and 31' shown here have identical modulation (same slope and same period of the modulation ramp) and the same is also true of modulation ramps 32 and 32'. In the example shown here, the absolute value of the slopes of modulation ramps 31 and 32 and 31' and 32' is the same. However, this need not be the case and modulation ramps having different absolute slopes may also be provided. Modulation cycles including more than two different modulation ramps are also possible.

Figure 3:
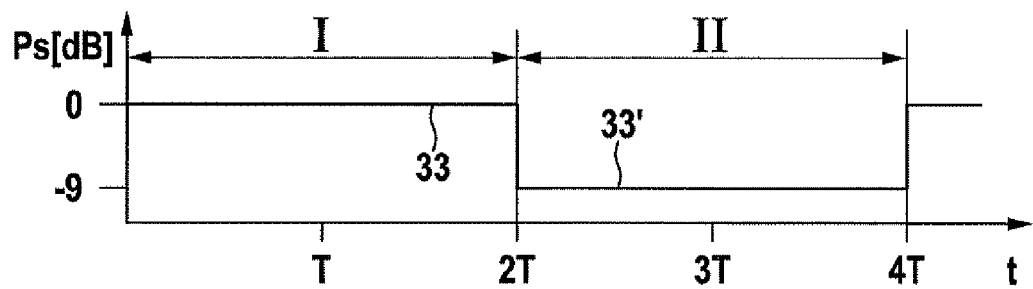
FIG. 3 shows a diagram to represent the transmission power as a function of time in a transmission signal.

Emitted transmission power $P_S$ of transmission signal S may be the same for all modulation ramps 31, 31', 32, 32'. However, in certain cases, as shown in conjunction with FIGS. 7 through 11, for example, it is advantageous to vary transmission power $P_S$. For this purpose, amplifier 13 may be triggered by detection unit 18 in such a way that the transmission signal is emitted at a lower transmission power $P_S$ during the pass-through of modulation ramps 31' and 32' than during modulation ramps 31 and 32. This is illustrated in FIG. 3, where modulation ramps 31 and 32 are combined into one period I, and modulation ramps 31', 32' are combined into one period II. During period II, transmission power $P_S$ is lower by 9 dB with respect to period I, as shown by curve sections 33 and 33'. This diagram is repeated cyclically in the following periods accordingly. During the pass-through of each modulation ramp, an amplitude spectrum A(f) of intermediate frequency signal ZF is ascertained and supplied to detection unit 18 for precipitation and to analysis unit 19.

According to the example embodiment of the present invention, the signals received by the radar sensor for detecting precipitation are analyzed on the basis of two different criteria, one of the criteria relating to signals received during the pass-through of a modulation ramp and a second of the criteria relating to a comparison of signals received during the pass-through of at least two successive modulation ramps. The two criteria are explained in greater detail below on the basis of exemplary embodiments. A corresponding method for analysis of the signals and for reviewing the criteria may be performed by the radar sensor shown in FIG. 1, for example.

Figure 4:
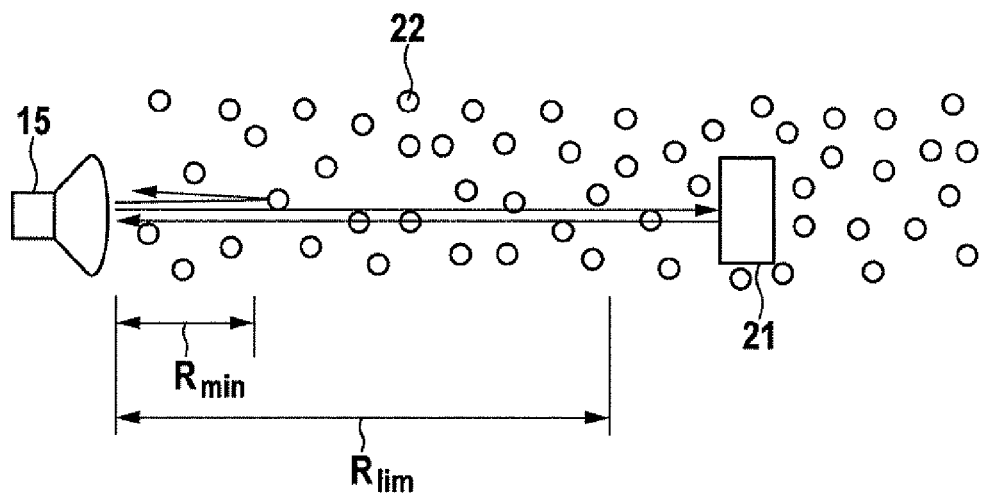
FIG. 4 shows a schematic diagram of the reflection of transmission signals on an object and on precipitation.

FIG. 4 initially illustrates the influence of precipitation 22, which is represented here as raindrops, for example, on the radar signal received by transmitting and receiving antenna 15. As symbolized by arrows, transmission signal S is reflected not only by object 21 but also on individual drops of precipitation 22. This results, on the one hand, in a plurality of backscatter signals, equivalent to a diffuse scattering of the transmitting signal, and, on the other hand, in an attenuation of the signal, which is received by transmitting and receiving antenna 15 after being reflected on object 21. At a relative speed of zero with respect to the radar sensor, objects at a distance closer than a minimal distance $R_{min}$ from the radar sensor are not detected by the radar sensor because of the short transit time of the signals reflected on them—in intermediate frequency signal ZF they differ too little from transmission signal S in their frequency and therefore cannot be separated from it. Taking into account a relative velocity of the objects with respect to the radar sensor, which is different from zero, minimal distance $R_{min}$ may be reduced down to a value of zero, however, as a function of the relative velocity. For objects as small as the drops of precipitation 22 having a low backscatter accordingly there is thus a maximal detection distance $R_{lim}$ which is typically in the range of 10 to a few times 10 meters. These detection limits are shown in FIG. 4 as an example. Only in the distance range between $R_{min}$ and $R_{lim}$ is rain clutter elevated above the noise background of the radar sensor due to signal backscatter on the raindrops.

Figure 5:
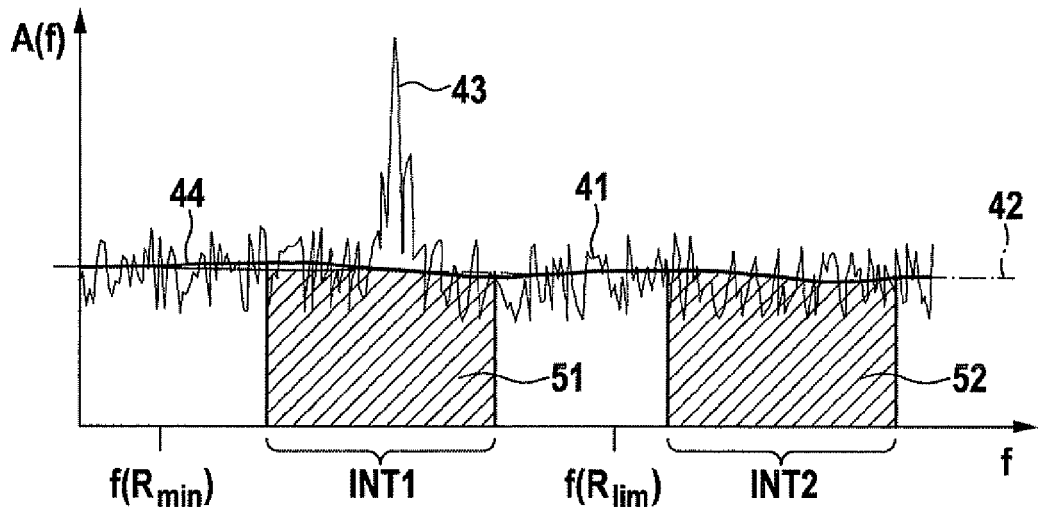
FIG. 5 shows an example of a spectrum of an intermediate frequency signal of a radar sensor in the absence of precipitation.

FIG. 5 shows curve 41, which is a typical curve of an amplitude spectrum A(f) for the case when there is no precipitation. In the example shown here, a peak 43, which is definitely distinguished from a noise background 42, represents a located object 21. Assuming the raindrops have a negligible horizontal velocity relative to the background, which thus yields the horizontal velocity relative to the radar sensor from the vehicle speed, detection limits $R_{min}$ and $R_{lim}$ for detecting precipitation may be converted to corresponding frequencies $f(R_{min})$ and $f(R_{lim})$, which are plotted on the abscissa in FIG. 5. Located object 21 is thus within the detection limits for precipitation here. Apart from peak 43, the average height of curve 41 for all other frequencies (and thus distances) is given by the level of noise background 42, which is approximately constant over the entire distance range.

Figure 6:
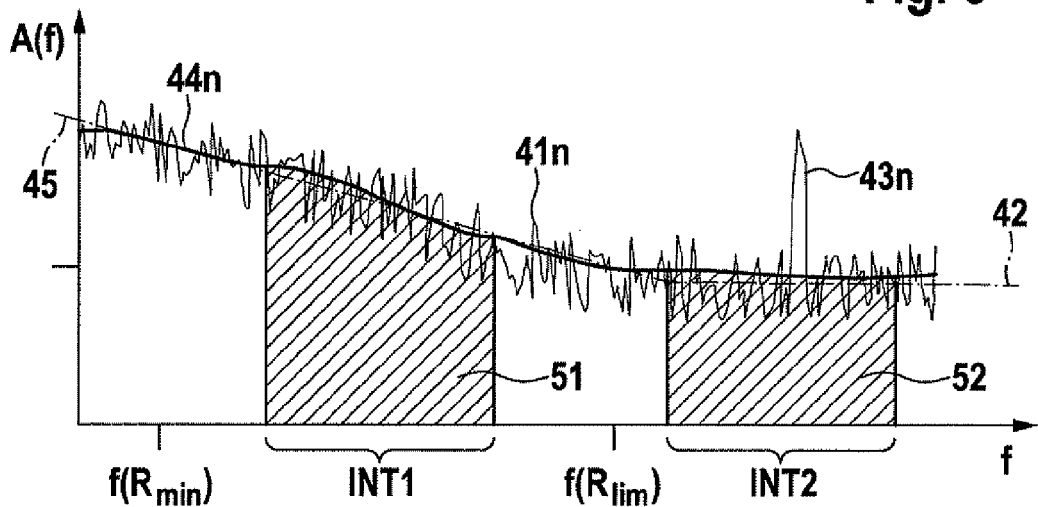
FIG. 6 shows an example of a spectrum of an intermediate frequency signal of a radar sensor in the presence of precipitation.

For comparison, FIG. 6 shows a curve 41n of an amplitude spectrum A(f) in the presence of precipitation 22. Here again, a peak 43n represents an object 21, for example, a vehicle whose distance here is greater than limiting distance $R_{lim}$. Apart from the different distance of objects 21 in the situations depicted in FIGS. 5 and 6, the lower height of peak 43n is also attributable to an attenuation of the radar signal due to the reflection on the raindrops and absorption by the drops of precipitation 22. On the other hand, the reflection on these drops causes the aforementioned rain clutter, which is discernible in FIG. 6 outside of peak 43n in the form of a background signal 45, which is higher than noise background 42. Above limiting distance $R_{lim}$ background signal 45 of the rain clutter is no longer distinguishable from noise background 42 and therefore is no longer detectable.

In one embodiment of the first criterion, detection of precipitation is now possible by integrating amplitude spectrum A(f) or the power density spectrum $(A(f))^2$ as the square of the amplitude spectrum over a first frequency interval 51 corresponding to a distance interval INT1, which is situated between minimal distance $R_{min}$ and limiting distance $R_{lim}$. Since noise background 42 for a given type of radar locating device is known, the value to be expected for this integral in the precipitation-free case is known. If the present value of the integral is significantly greater, this indicates the presence of precipitation. Interfering influences, in particular temperature and aging effects, which influence the sensitivity of the radar locating device, and special installation conditions of the radar sensor may, however, influence the level of noise background 42.

To achieve greater independence with respect to such interfering influences, in another embodiment of the first criterion for the precipitation detection, it is possible to perform the integration not only over interval INT1, which is below limiting distance $R_{lim}$, i.e., in ranges where rain clutter may occur but also over a second frequency range 52 corresponding to a second distance range INT2, which is above limiting distance $R_{lim}$, i.e., in the range in which the power density outside of object peaks is determined only by noise background 42. The width of second distance range INT2 may be equal to that of first distance interval INT1. For detecting precipitation, not only is integral INT1 used but also the ratio of integral INT1 to integral INT2 is used.

However, as is the case illustrated in FIG. 5, if at least one object 21 (peak 43) is situated in distance interval INT1 over which integration is to be performed in the event precipitation is detected, then peak 43 in the precipitation-free case would also result in the value of integral INT1 increasing with respect to integral INT2 and changing the ratio thereof. It is impossible to decide whether the increase in the integral over interval INT1 is caused only by the object or additionally also by precipitation.

Therefore, to determine the integrals, amplitude spectrum A(f) is preferably not integrated directly but instead is initially subjected to a filter procedure which disregards the individual peaks. The result of such a filter procedure is plotted as curve 44 and 44n in FIGS. 5 and 6. Curves 44 and 44n follow a smoothed characteristic of curves 41 and 41n but peaks 43 and 43n originating from the object are "blanked out" to a certain extent. The integrals over intervals INT1 and INT2 are now determined by integration of curves 44 and 44n and not by integration of curves 41 and 41n, so that the resulting values are as independent as possible of whether or not an object occurs in interval INT1.

In radar sensors, it is frequently provided to determine a detection threshold for each frequency value or distance value on the basis of a noise estimate, and this threshold must at least extend above a peak 43, 43n caused by an object, so that the corresponding object is reliably detectable. Curves 44 and 44n, over which integration is performed over intervals INT1 and INT2 to ascertain the integrals, run generally parallel to such detection thresholds and may be obtained by a similar method or ascertained from such detection thresholds.

To verify the first criterion, detection unit 18 shown in FIG. 1 has a comparator stage, which is used to compare the integrals formed over first and second distance ranges INT1 and INT2 with one another and to determine, for example, the ratio of these two integrals to one another. This ratio directly supplies a measure for the intensity of the precipitation, where a ratio approaching 1 represents the precipitation-free state. If the ratio exceeds a predefined value greater than 1, then the first criterion of precipitation detection is met. Furthermore, a minimum quantity for the integral in first distance range INT1 may be defined, and this minimum quantity must be exceeded independently of the ratio of the two integrals before the first criterion is regarded as having been met (minimum rain backscatter power). In the presence of multiple objects in first distance range INT1, however, despite the filter procedure described here to blank out object peaks, the first criterion is met falsely in the absence of precipitation. Problematical driving situations in this regard include driving through a tunnel or an alleyway, for example.

The second criterion relates to a comparison of at least two amplitude spectra A(f) of intermediate frequency signal ZF obtained during at least two successive modulation ramps that are passed through.

Figure 7:
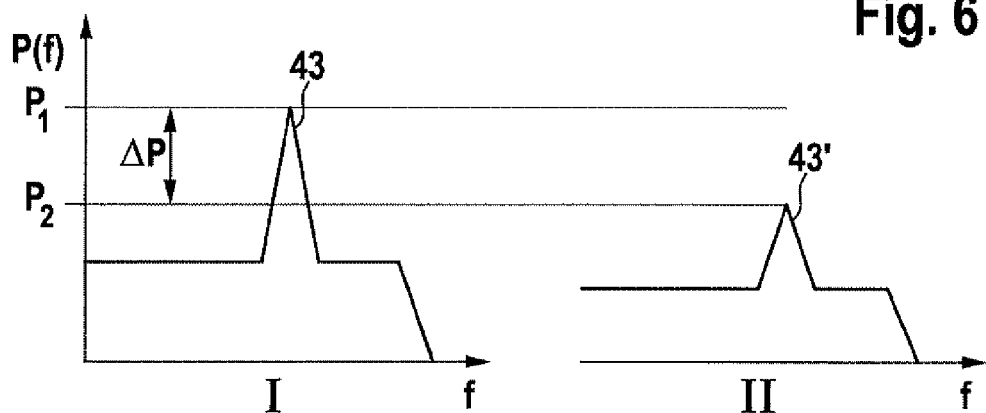
FIG. 7 shows schematic intermediate frequency spectra for various transmission powers of a transmission signal.

FIG. 7 shows as an example two schematic power spectra of received spectral power density $P(f)=(A(f))^2$ obtained in two successive modulation ramps using identical modulation, for example, modulation ramps 31 and 31'. As an example, it was again assumed that there is a single object 21 in the location range and is recognizable as peak 43 or 43' in the spectrum. The two spectra differ in the transmission power of the emitted transmission signal, which has changed according to the diagram shown in FIG. 3.

In period I (at the left in FIG. 7), peak 43 has maximum signal power $P_1$ at the peak frequency. In period II (at the right in FIG. 7), however, it has only smaller maximal signal power $P_2$ because of the reduction in the transmission power. If there is no precipitation and there are no other diffuse losses, then difference $\Delta P$ between signal power $P_1$ and $P_2$ should depend only on the reduction in power and therefore should retain a generally constant value if object 21 in question is tracked over multiple successive cycles or, more precisely, pairs of cycles with alternations in elevated and reduced transmission power. This assumption is justified because the duration of a single cycle is only 4 ms in practice, for example, and a real object such as a vehicle traveling ahead has relatively low dynamics, so that practically nothing should change at the height of peak 43 within a period of a few milliseconds or a few tens of milliseconds.

However, the situation is different with precipitation. Each drop of precipitation 22 acts like a small reflective target or object, as shown in FIG. 4, leaving a small peak in the spectrum according to FIG. 7. These peaks are scattered over a broad frequency band and, as described above, they also contribute so-called rain clutter to the background of the spectra in FIG. 7.

If one considers signal power difference $\Delta P$, this should be generally constant in the absence of precipitation. The high relative dynamics of the drops of precipitation 22 in the vertical direction in the near range, however, already results in a definite statistical fluctuation in signal power difference $\Delta P$ in the time interval of 4 ms between modulation ramps 31 and 31'. The scattering or variance in signal power difference $\Delta P$ is therefore a suitable measure for the presence of precipitation.

FIGS. 8 through 11 illustrate the results of experimental measurements illustrating this effect.

Figure 8:
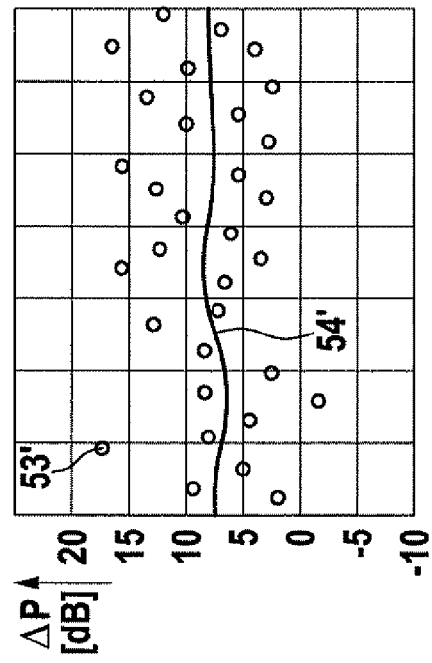
FIG. 8 shows a diagram of signal power differences in successive intermediate frequency spectra in the absence of precipitation.

These experimental measurements extended over a period of approximately 10 minutes each. FIG. 8 shows the results of a few individual measurements of signal power differences $\Delta P$ within this period of time, plotted against time t. Signal power difference $\Delta P$ has been determined here on the basis of the integrated signal power in a specified range of the signal spectrum and not as illustrated in FIG. 7 on the basis of the height of an object peak. Each individual determination of signal power difference $\Delta P$ is represented by a checkpoint 53, which indicates signal power difference $\Delta P$ between two successive cycles. Curve 54 in FIG. 8 indicates the average value formed by low-pass filtering of the individual measurements (using a suitable time constant).

The results illustrated in FIG. 8 are recorded in a dry measurement; in other words, only object 21 has been detected and no precipitation was present.

Figure 9:
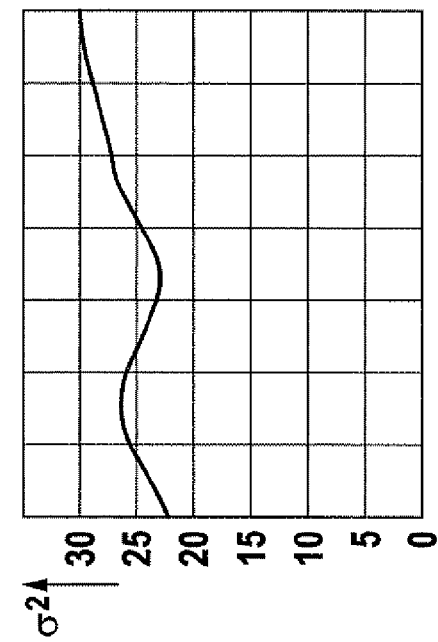
FIG. 9 shows a diagram of signal power differences in successive intermediate frequency spectra in the presence of precipitation.

However, FIG. 9 shows corresponding checkpoints 53' and averaged curve 54' for a measurement in the presence of precipitation. The precipitation has practically no effect on the average signal power difference (curve 54') but results in much stronger scattering of the individual measurements symbolized by checkpoints 53'. This scattering or variance therefore forms the basis for the second criterion of detection of precipitation and therefore also for a quantitative determination of the precipitation intensity.

If a sequence of successive individual measurements is considered, in which k denotes the index of individual measurements, then the variance may be determined, for example, using the following formula $$\sigma_k^2 = a(\Delta P_k - \text{AVE}(\Delta P_k))^2 + (1-a)\sigma_{k-1}^2 \quad (1)$$

wherein $\sigma_k^2$ is the estimated variance of the signal power difference in individual measurement k,
a is a filter coefficient,
$\Delta P_k$ is the result of the current individual measurement and $\text{AVE}(\Delta P_k)$ is the (estimated) average of the signal power difference in individual measurement k.

The low pass-filtered value represented by curves 54 and 54' in FIGS. 8 and 9 may be used as estimated average $\text{AVE}(\Delta P_k)$. A suitable value for filter coefficient a is 0.05, for example.

Figure 10:
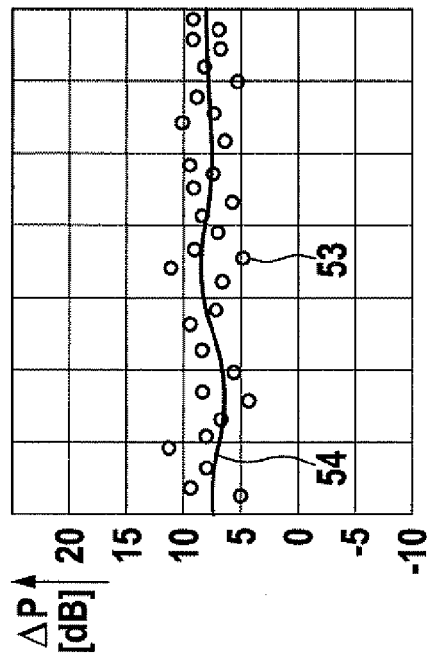
FIGS. 10 and 11 show diagrams of the variances of the signal power differences in the successive measurements depicted in FIGS. 8 and 9.
Figure 11:
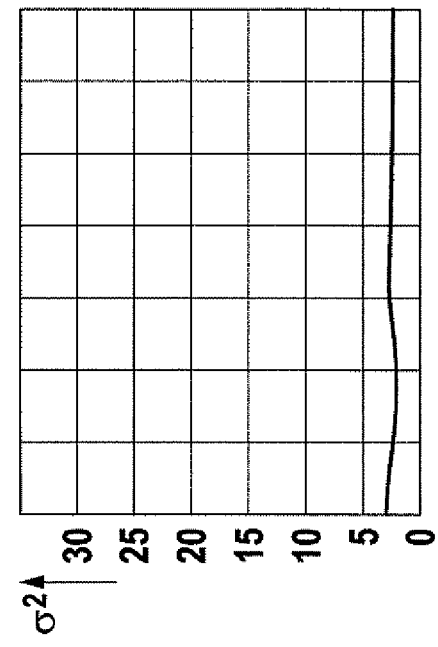

FIGS. 10 and 11 show variance $\sigma_k^2$ over time according to equation (1) for the dry measurement according to FIG. 8 and the measurement with precipitation present corresponding to FIG. 9. In the precipitation measurement according to FIG. 11, the variance very rapidly stabilizes at a level significantly higher than the level of the variance for a dry measurement according to FIG. 10.

To verify the second criterion, detection unit 18 shown in FIG. 1 therefore has an analyzer unit for determining variance $\sigma_k^2$ and a comparator stage, which compares variance $\sigma_k^2$ with a suitable threshold value. If the threshold value is exceeded, then the second criterion is regarded as having been met. The advantage of the method described here in conjunction with the second criterion is that detection of precipitation is also possible in particular in the presence of objects 21, such as vehicles traveling ahead and the like. A high object density which has a negative effect on the reliability of the first criterion does not limit the applicability of this method.

In the exemplary embodiment described here regarding the second criterion, the power of the transmission signal has been varied cyclically. For recognition of the loss of sensitivity, a feature in the amplitude spectrum or power spectrum which showed a sensitive response to the change in the transmission power has been selected with peak 43. Due to the relative measurement with rapidly successive modulation ramps, the measurement has a less sensitive response to interfering factors such as temperature or aging of the radar sensor and the like. The amplitude (or power) of such features should preferably be analyzed for modulation ramps, in which the transmission power was variable but which were separated over time as little as possible, so that the dynamics of located objects still may have practically no influence on the features. For example, if a measuring cycle includes two or more different modulation ramps, it is advantageous to vary the transmission power after each measuring cycle. According to FIG. 3, there is only one change between two transmission power levels, but in general a change between three or more transmission power levels is also possible. On the other hand, the change in the transmission power need not necessarily be made after each measuring cycle. For example, it may be sufficient to insert a single measuring cycle in which the transmission power is reduced after several measuring cycles of a constant transmission power. It is likewise also possible to shut down detection unit 18 temporarily and activate it only in certain intervals, during which it then triggers amplifier 13 in such a way that the system goes into a special blindness mode in which the modulation and the power reduction in the transmission signal are optimized with respect to blindness detection or detection of diffuse loss sources.

Alternatively, it is also possible to execute the method presented here in conjunction with the second criterion at a constant transmission power. Even then, an increased variance in the amplitude (or power) of features, e.g., peaks, may be observed in the presence of precipitation. However, the difference is not so pronounced under some circumstances.

As already mentioned, a difference in the second criterion from the first criterion is that a high object density, for example, in the case of driving through an alleyway or through a tunnel, does not result in a false detection of precipitation. On the other hand, however, any influences may also falsely result in fulfillment of the second criterion, as explained below.

As indicated in equation (1), to determine variance $\sigma_k^2$ of the signal power differences, the average of signal power difference $AVE(\Delta P_k)$ for individual measurement k is needed. It lends itself to ascertain this average (sliding average) with the aid of low-pass filtering from multiple successive measurements. However, the time constant of the low-pass filter results in a false value for the average when there is a rapid change in the signal power difference (trailing the filter) so that variance $\sigma_k^2$ is also wrong and in particular determined to be too large. A rapid change in signal power difference may result from the radar sensor suddenly going blind, for example, due to snow slush being splashed on its transmitting and receiving antenna or its radar lens or radar cover (radome). As a result of variance $\sigma_k^2$ being determined to be too large, the second criterion may be falsely met. However, suddenly going blind has no effect on the first criterion, in which different frequency ranges of a spectrum are compared, these ranges being equally affected by the blinding.

A situation, in which little backscattered power is received on the whole, for example, when traveling on a snow-covered but clear country road (no other vehicles within the range of detection), is problematical with regard to a false fulfillment of the second criterion because scattering generally increases due to the low power received. However, this situation is not problematical for the first criterion because with a low backscattered received power on the whole, a minimum rain backscatter power is not exceeded under dry conditions and consequently the first criterion will not be met.

The error-prone situations, which may result in an apparent detection of precipitation with one of the criteria, are thus not problematical precisely for the other criterion.

Detection unit 18 is therefore equipped in such a way that it detects precipitation as detected and outputs precipitation signal N at its output only if the first and second criteria are met simultaneously. It may additionally be provided that precipitation is considered as confirmed only if both criteria are met simultaneously for more than one predefined period of time.

In the examples described above, the analysis of the received radar signals has been performed on the basis of amplitude spectrum A(f) of intermediate frequency signal ZF. In a modified specific embodiment, however, it is also possible to directly analyze the time signal of intermediate frequency spectrum ZF obtained in analog/digital converter 16.

What is claimed is:

1. A method for detecting precipitation using a radar sensor which emits a transmission signal whose frequency is varied periodically in successive modulation ramps, the method comprising:
   receiving, by the radar sensor, at least one signal;
   mixing, by a mixer of the radar sensor, the received signal with at least a portion of the transmission signal to produce at least one intermediate frequency signal;
   calculating, by a detection unit of the radar sensor, a first value as a function of first and second different predetermined frequency ranges of a modulation ramp of the intermediate frequency signal;
   comparing, by the detection unit, the calculated first value to a first threshold;
   analyzing, by the detection unit, whether a first criterion is met based on the comparing of the first value to the first threshold;
   calculating, by the detection unit, a second value as a function of a difference in signal power of at least two successive modulation ramps of the intermediate frequency signal;
   comparing, by the detection unit, the calculated second value to a second threshold;
   analyzing, by the detection unit, whether a second criterion is met based on the comparing of the second value to the second threshold; and
   generating, by the detection unit, a precipitation signal indicating whether precipitation is detected based on whether the first and second criterion are met.

2. The method as recited in claim 1, wherein precipitation is considered as being detected only when both criteria are met simultaneously.

3. The method as recited in claim 1, wherein precipitation is considered as being detected only if both criteria are met simultaneously for longer than a predefined period of time.

4. The method as recited in claim 1, wherein the calculating of the first value includes integrating the intermediate frequency signal over the first frequency range, which corresponds to a first distance interval, which is below a limiting distance for the detection of precipitation, and the first criterion is regarded as being met as a function of the value of the integral over the first distance interval.

5. The method as recited in claim 1, wherein the calculating of the first value includes integrating the intermediate frequency signal over the first frequency range, which corresponds to a first distance interval, which is below a limiting distance for the detection of precipitation, and integrating the intermediate frequency signal over the second frequency range, which corresponds to a second distance interval, which is above the limiting distance, and the first criterion is regarded as being met depending on a ratio of the integrals over the first and second distance intervals.

6. The method as recited in claim 5, wherein the calculating of the first value includes subjecting the intermediate frequency signal before integration to filtering which suppresses peaks caused by located objects.

7. The method as recited in claim 1, wherein the calculating of the second value includes determining the signal power difference from a power of the intermediate frequency signal in a predefined frequency range during the pass-through of the at least two successive modulation ramps, and the second criterion is regarded as being met depending on a size of the variance of the signal power difference.

8. The method as recited in claim 1, further comprising emitting the transmission signal at an emitted power that for the at least two successive modulation ramps is different.

9. The method as recited in claim 1, wherein the intermediate frequency signal is subjected to a spectral analysis, the spectral analysis being performed one of on the amplitude spectrum or on a power density spectrum.

10. The method as recited in claim 1, wherein the at least one signal is received by at least one antenna of the radar sensor.

11. The method as recited in claim 1, further comprising emitting the transmission signal by at least one antenna of the radar sensor.

12. The method as recited in claim 1, further comprising providing the generated precipitation signal to a driver assistance system.

13. The method as recited in claim 1, further comprising digitizing, by an analog-to-digital converter of the radar sensor, the intermediate frequency signal.

14. A radar sensor for vehicles operating according to a method using successive modulation ramps for periodic frequency modulation of a transmission signal, the sensor comprising:
a receiving unit to receive at least one signal;
a mixer to mix the received signal with at least a portion of the transmission signal to produce at least one intermediate frequency signal; and
a detection unit to:
calculate a first value as a function of first and second different predetermined frequency ranges of a modulation ramp of the intermediate frequency signal;
compare the calculated first value to a first threshold;
analyze whether a first criterion is met based on the comparing of the first value to the first threshold;
calculate a second value as a function of a difference in signal power of at least two successive modulation ramps of the intermediate frequency signal;
compare the calculated second value to a second threshold;
analyze whether a second criterion is met based on the comparing of the second value to the second threshold; and
generate a precipitation signal indicating whether precipitation is detected based on whether the first and second criterion are met.

15. The radar sensor as recited in claim 14, wherein precipitation is considered as being detected only when both criteria are met simultaneously.

16. The radar sensor as recited in claim 14, wherein precipitation is considered as being detected only if both criteria are met simultaneously for longer than a predefined period of time.

17. The radar sensor as recited in claim 14, wherein the calculating of the first value includes integrating the intermediate frequency signal over the first frequency range, which corresponds to a first distance interval, which is below a limiting distance for the detection of precipitation, and the first criterion is regarded as being met as a function of the value of the integral over the first distance interval.

18. The radar sensor as recited in claim 14, wherein the calculating of the first value includes integrating the intermediate frequency signal over the first frequency range, which corresponds to a first distance interval, which is below a limiting distance for the detection of precipitation, and integrating the intermediate frequency signal over the second frequency range, which corresponds to a second distance interval, which is above the limiting distance, and the first criterion is regarded as being met depending on a ratio of the integrals over the first and second distance intervals.

19. The radar sensor as recited in claim 18, wherein the calculating of the first value includes subjecting the intermediate frequency signal before integration to filtering which suppresses peaks caused by located objects.

20. The radar sensor as recited in claim 14, wherein the calculating of the second value includes determining the signal power difference from a power of the intermediate frequency signal in a predefined frequency range during the pass-through of the at least two successive modulation ramps, and the second criterion is regarded as being met depending on a size of the variance of the signal power difference.

21. The radar sensor as recited in claim 14, wherein an emitted power of the transmission signal for the at least two successive modulation ramps is different.

22. The radar sensor as recited in claim 14, wherein the intermediate frequency signal is subjected to a spectral analysis, the spectral analysis being performed one of on the amplitude spectrum or on a power density spectrum.

23. A device for detecting precipitation, the device comprising:
a receiving unit to receive at least one signal;
a mixer to mix the received signal with at least a portion of a transmission signal to produce at least one intermediate frequency signal; and
a detection unit to:
calculate at least one first value based on first and second predetermined frequency ranges of the intermediate frequency signal;
calculate at least one second value as a function of at least two successive modulation ramps of the intermediate frequency signal;
compare the at least one first value to a first threshold and compare the at least one second value to a second threshold; and
generate a precipitation signal indicating whether precipitation is detected as a function of the comparing of the at least one first value to the first threshold and the comparing of the at least one second value to the second threshold.

24. The device as recited in claim 23, wherein the detection unit is configured to calculate the at least one first value as a function of integrations based on an amplitude or power spectrum of the intermediate frequency signal in the first and second predetermined frequency ranges.

25. The device as recited in claim 24, wherein the detection unit is configured to calculate the at least one second value as a function of integrations based on an amplitude or power spectrum of the at least two successive modulation ramps of the intermediate frequency signal.

26. A method for detecting precipitation, the method comprising:
receiving, by a radar sensor, at least one signal;
mixing, by a mixer of the radar sensor, the received signal with at least a portion of a transmission signal to produce at least one intermediate frequency signal; and
by a detection unit of the radar sensor:
calculating at least one first value based on first and second predetermined frequency ranges of the intermediate frequency signal;
calculating at least one second value as a function of at least two successive modulation ramps of the intermediate frequency signal;
comparing the at least one first value to a first threshold and comparing the at least one second value to a second threshold; and
generating a precipitation signal indicating whether precipitation is detected as a function of the comparing of the at least one first value to the first threshold and the comparing of the at least one second value to the second threshold.

27. The method as recited in claim 26, wherein the detection unit is configured to calculate the at least one first value as a function of integrations based on an amplitude or power spectrum of the intermediate frequency signal in the first and second predetermined frequency ranges.

28. The method as recited in claim 26, wherein the detection unit is configured to calculate the at least one second value as a function of integrations based on an amplitude or power spectrum of the at least two successive modulation ramps of the intermediate frequency signal.

29. The method as recited in claim 13, further comprising performing, by a frequency analyzer, a Fast Fourier Transform on the intermediate frequency signal.

\* \* \* \* \*